United States Patent
Busiello

(10) Patent No.: US 10,150,453 B2
(45) Date of Patent: Dec. 11, 2018

(54) WINDSHIELD WIPER FLUID REFILLING SYSTEM

(71) Applicant: Faraday & Future Inc., Gardena, CA (US)

(72) Inventor: Marco Busiello, Torrance, CA (US)

(73) Assignee: FARADAY & FUTURE INC., Gardena, CA (US)

(*) Notice: Subject to any disclaimer, the term of this patent is extended or adjusted under 35 U.S.C. 154(b) by 262 days.

(21) Appl. No.: 14/928,632

(22) Filed: Oct. 30, 2015

(65) Prior Publication Data

US 2017/0120876 A1    May 4, 2017

(51) Int. Cl.

| | |
|---|---|
| B01D 21/00 | (2006.01) |
| B01D 21/02 | (2006.01) |
| B01D 35/02 | (2006.01) |
| B05B 15/40 | (2018.01) |
| B05B 1/10 | (2006.01) |
| B05B 9/04 | (2006.01) |
| B60S 1/50 | (2006.01) |

(52) U.S. Cl.
CPC .......... B60S 1/50 (2013.01); B01D 21/0003 (2013.01); B01D 21/003 (2013.01); B01D 21/0039 (2013.01); B01D 21/0045 (2013.01); B01D 21/0066 (2013.01); B01D 21/0087 (2013.01); B01D 21/02 (2013.01); B01D 35/02 (2013.01); B05B 1/10 (2013.01); B05B 9/0403 (2013.01); B05B 15/40 (2018.02)

(58) Field of Classification Search
CPC . B60S 1/50; B05B 1/10; B05B 15/008; B05B 9/0403; B05B 15/40; B01D 21/0003; B01D 21/003; B01D 21/0039; B01D 21/0045; B01D 21/0048; B01D 21/006; B01D 21/0066; B01D 21/0087; B01D 21/02; B01D 21/08; B01D 35/02; B01D 35/023; B01D 35/027
See application file for complete search history.

(56) References Cited

U.S. PATENT DOCUMENTS

| | | | | |
|---|---|---|---|---|
| 2,413,375 | A  * | 12/1946 | Pomeroy | B01D 17/047 210/206 |
| 9,000,000 | B2 * | 4/2015 | Carroll | B60S 1/50 134/109 |
| 2010/0243550 | A1* | 9/2010 | Wilder | C02F 1/003 210/202 |
| 2013/0206266 | A1* | 8/2013 | Stenhouse | B60S 1/50 137/899.4 |

* cited by examiner

*Primary Examiner* — Lucas A Stelling
(74) *Attorney, Agent, or Firm* — Veros Legal Solutions, LLP

(57) ABSTRACT

In one embodiment, the windshield wiper fluid refilling system includes a removable filter configured to receive fluid through a first opening from outside an automobile. The removable filter includes one more filtering components therein for removing contaminants from the fluid. A reservoir is configured to couple to the removable filter and receive the fluid from the removable filter through a second opening formed therein. The reservoir including a pump inlet configured to pump the fluid from the reservoir to a windshield of the automobile. The windshield wiper fluid refilling system allows the wiper fluid to be refilled without needing access to the hood of the automobile.

10 Claims, 3 Drawing Sheets

WINDSHIELD WIPER FLUID REFILLING SYSTEM

FIELD OF THE DISCLOSURE

The disclosure relates generally to a windshield wiper fluid refilling system, and more specifically to a reservoir that will automatically refill the wiper fluid without opening the hood of an automobile.

BACKGROUND OF THE DISCLOSURE

The hood of an automobile contains many vital portions of the automobile's systems and components. While having access to many of these components is not necessary for the average automobile user, a small number of components need to be accessible for simple maintenance and for refilling various fluids, including wiper fluid for cleaning the windshield.

In order to refill the windshield wiper fluid, automobiles have a reservoir located under the hood of the automobile that can be refilled with fluid. These reservoirs are positioned in the automobile such that the car owner or other individual accesses the reservoir by opening the hood of the automobile. This allows an individual to open the wiper fluid reservoir and refill the fluid. Thus, the entire contents of the hood of the automobile are accessible when the wiper fluid reservoir is accessed for refilling. It is becoming increasingly unnecessary for the owner to be able to access the contents of the hood, especially in electric vehicles. It could be possible for the hood of an electric vehicle to be a closed panel, except for the need to refill the windshield wiper fluid.

The present disclosure allows the user to fill the wiper fluid without opening the hood of the automobile.

SUMMARY OF THE DISCLOSURE

One aspect of the disclosure relates to a windshield wiper fluid refilling system. In one embodiment, the windshield wiper fluid refilling system includes a removable filter configured to receive fluid through a first opening from outside an automobile. The removable filter includes one or more filtering components therein for removing contaminants from the fluid. A reservoir is configured to couple to the removable filter and receive the fluid from the removable filter through a second opening formed therein. The reservoir including a pump inlet configured to pump the fluid from the reservoir to a windshield of the automobile. The windshield wiper fluid refilling system allows the wiper fluid to be refilled without needing access to the inside of the hood of the automobile.

In one embodiment, the filtering components of the removable filter are in the form of ribs extending vertically from a top and bottom portion of the removable filter. The ribs are configured to filter particles from the fluid. The ribs are configured to decrease in size from the location of the first opening in the removable filter to the second opening in the removable filter such that larger particles in the fluid are filtered out first and trapped in the larger ribs near the first opening.

In one embodiment, the reservoir includes various features, such as an overflow outlet to prevent the reservoir from overflowing with fluid. The reservoir can also include a tablet therein that is configured to dissolve in the fluid and remove contaminants therein. The tablet can also be configured to lower the freezing point of the fluid to prevent the fluid from freezing in the reservoir, and/or include an additive for repelling water off the windshield of the automobile.

Another aspect of the disclosure relates to a windshield wiper fluid system that includes a removable filter configured to receive fluid through a first opening from outside an automobile. The removable filter includes one or more filtering components therein for removing contaminants from the fluid. A reservoir is configured to removably couple to the removable filter and receive the fluid from the removable filter through a second opening formed therein. The reservoir includes a pump inlet configured to pump the fluid from the reservoir to a windshield of the automobile. A tablet is positioned in a portion of the reservoir and is configured to remove contaminants from the fluid in the reservoir. The tablet is configured to dissolve into the fluid in the reservoir.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the disclosure, the scope of which is defined only by the claims.

DESCRIPTION OF A PREFERRED EMBODIMENT

Figure 1:
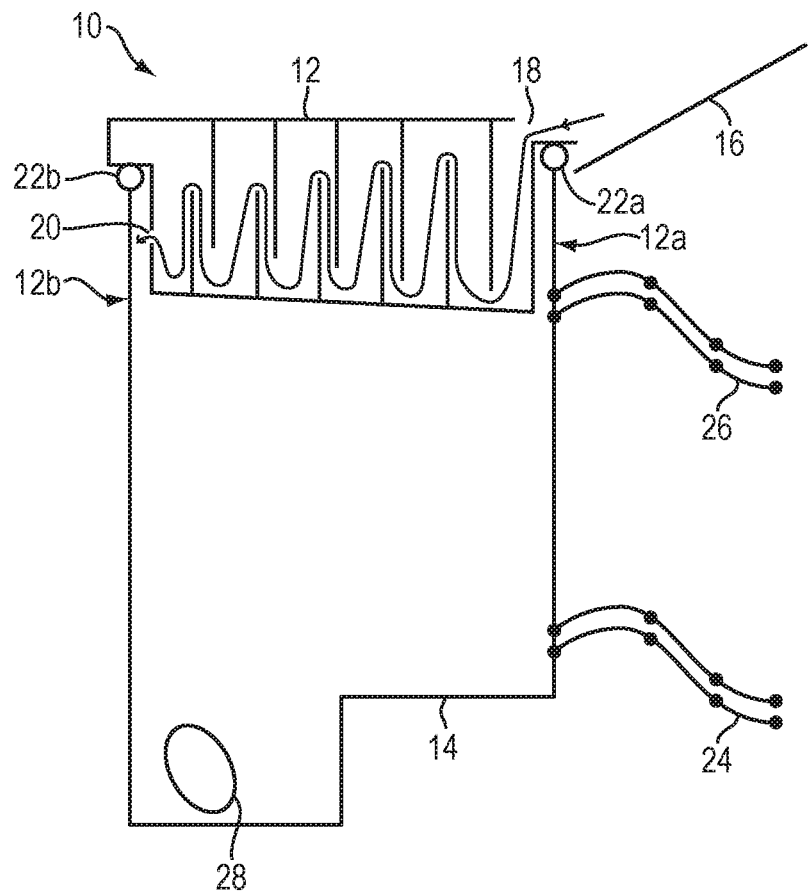
FIG. 1 is a highly schematic diagram of a windshield wiper fluid system constructed in accordance with an embodiment of the disclosure.

Referring to FIG. 1, a windshield wiper fluid refilling system 10 constructed in accordance with an embodiment of the disclosure includes a removable filter 12 coupled to a reservoir 14 for holding fluid for cleaning a windshield 16 of an automobile. The fluid for filling the reservoir can be any fluid, such as rain water or other fluid, which flows down the windshield 16 and into an opening 18 formed at a first end 12a of the removable filter 12 such that the hood of the automobile does not need to be opened to refill the reservoir 14. The removable filter 12 is configured such that the fluid flows through a series of filtering ribs positioned inside the removable filter 12 and flows out of a second opening 20 positioned at a second end 12b of the removable filter 12. The fluid flows out of the second opening 20 and into the reservoir 14 for use as a windshield wiper fluid to clean the windshield 16 of the automobile.

Figure 3:
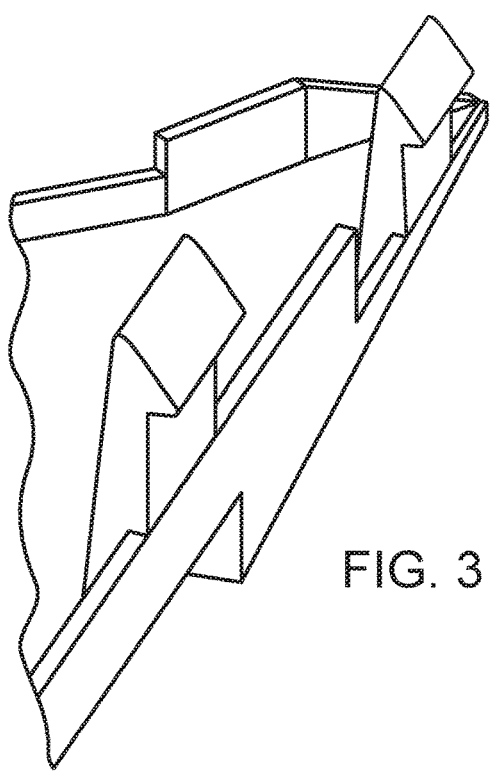
FIG. 3 is a perspective view of one embodiment of a tab for removably coupling a filter and a reservoir.
Figure 4A:
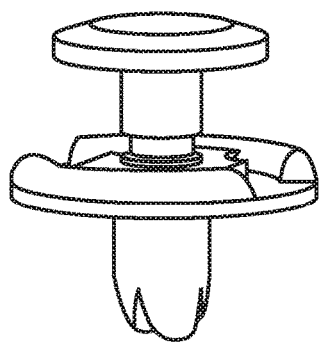
FIGS. 4A-4D are various views of one embodiment of a fastener for use with the tab shown in FIG. 3 for removably coupling the filter and the reservoir.
Figure 4B:
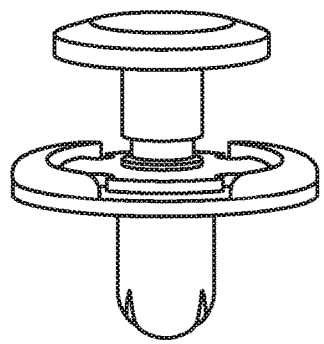
Figure 4C:
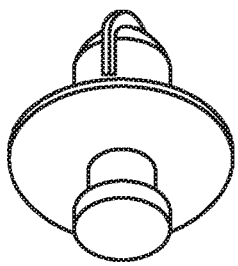
Figure 4D:
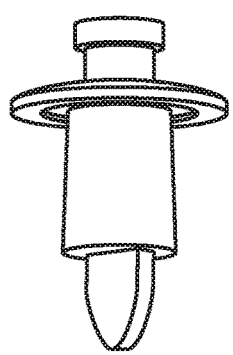

The removable filter 12 can be formed in a variety of shapes and sizes suitable for positioning near the surface of the hood of the automobile. The removable filter 12 can also be formed from a variety of materials. For example, the removable filter 12 can be manufactured from a plastic material using a 3D printing process. The removable filter 12 can also be formed from a light weight corrosive-resistant metal, such as aluminum or titanium, carbon fiber, fiberglass, a fiberglass reinforced plastic, or other composite materials. The removable filter 12 is coupled to the reservoir 14 such that the removable filter 12 can be removed, and either replaced or emptied of filtered particles. Either a new removable filter or a cleaned removable filter can be replaced and coupled to the reservoir 14. The removable filter 12 can be removably coupled to the reservoir 14 in a variety of ways. In one embodiment, the reservoir 14 includes first and second gaskets 22a, 22b such that the removable filter 12 is configured to slide into a top portion of the reservoir 14, and a portion of the removable filter 12 rests on the first and second gaskets 22a, 22b. In another embodiment, the removable filter 12 can include at least two tabs, as shown in FIG. 3, positioned on opposed ends thereof. The tabs are configured to engage the reservoir 14. Each tab is configured to receive a fastener, as shown in FIGS. 4A-4D, such that the fastener is configured to go through the removable filter 12 and lock into the reservoir 14. The tabs and fasteners allow the removable filter 12 and the reservoir 14 to be temporarily locked together when the removable filter 12 is positioned in the reservoir 14. It will be understood that the removable filter 12 can be removably coupled to the reservoir 14 in any manner that allows the filter to be positioned near the top portion of the reservoir and be removed therefrom, or that the filter can be permanently attached to the reservoir rather than removably attached.

The removable filter 12 can include various features for filtering out a variety of particles and/or contaminants in the fluid, such as rain water, that enters the first end 12a of the removable filter 12 through the first opening 18. For example, rain water can include dirt particles, leaves, or other debris that should be removed from the fluid before being used as a windshield washer fluid. The first opening 18 can be positioned relative to the hood and windshield of the automobile to prevent some of the particles from entering the removable filter 12. In one embodiment shown in FIG. 1, the first opening 18 is located above the junction between the hood and the windshield such that some of the particles in the fluid will be caught at the junction point rather than entering the first opening 18.

Figure 2:
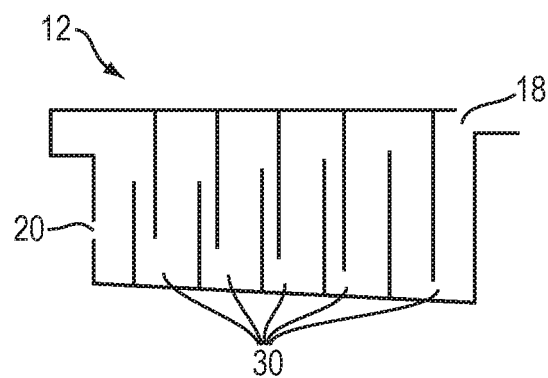
FIG. 2 is a cross-sectional diagram of an embodiment of a removable filter of an embodiment of the disclosure.

In one embodiment, the removable filter 12 includes a series of filtering ribs 30 that are configured to trap the various particles in the fluid and filter them therefrom. Referring to FIG. 2, the removable filter 12 of FIG. 1 is shown in more detail. The removable filter 12 includes a series of ribs in the form of vertical walls extending from the top and bottom of the removable filter 12 such that the fluid flows through the removable filter 12 past the series of vertical walls forming the filtering ribs 30. The filtering ribs 30 can have various sizes and shapes, but in one embodiment the filtering rib near the first opening 18 of the removable filter 12 is larger than the filtering rib near the second opening 20 of the removable filter 12 such that larger particles are filtered near the first opening 18. This allows the removable filter 12 to filter increasingly smaller particles and contaminants in the fluid as the fluid passes through the removable filter 12 from the first opening 18 to the second opening 20. Various other configurations for the filtering ribs inside the removable filter 12 can be used, including a configuration where all the ribs are equally sized or a configuration where the ribs increase in size from the first opening 18 to the second opening 20 such that the smaller particles and/or contaminants in the fluid are filtered before the larger particles and/or contaminants. In addition, other techniques can be used to filter the fluid, such as the use of a series of mesh or net screens with different size openings to filter out different sized particles from the fluid, or other any technique that would achieve fluid filtering.

Figure 5:
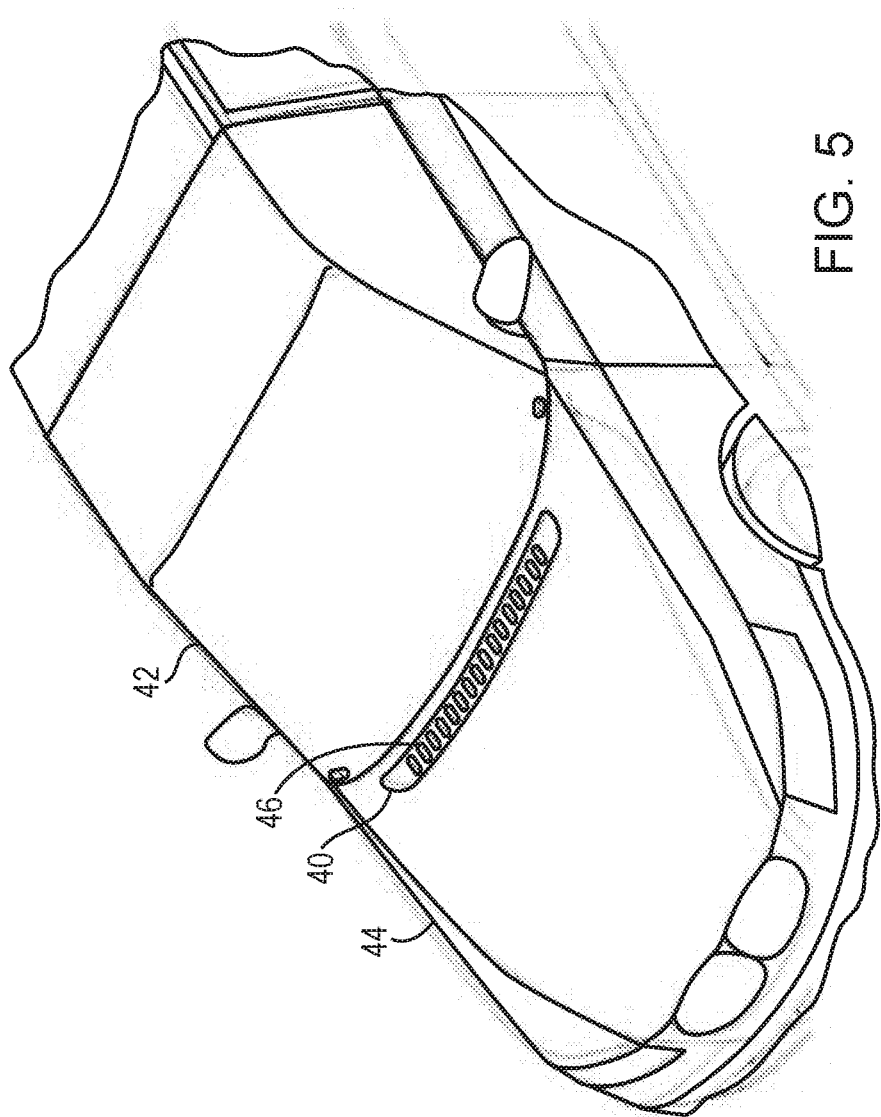
FIG. 5 is a diagram of a windshield wiper fluid system positioned in a hood of an automobile in accordance with an embodiment of the disclosure.

In one embodiment, shown in FIG. 5, a removable filter 40 is positioned such that a top surface of the removable filter 40 is substantially flush with a hood 44 of the automobile. Fluid, such as rain water, will flow down a windshield 42 of the automobile and into a first opening 46 of the removable filter 40. The position of the removable filter 40 relative to the hood 44 allows the removable filter 40 to be removed from the surface of the hood 44 without actually opening the hood 44 of the automobile to allow the removable filter 40 to be replaced or cleaned of particles filtered out of the fluid.

The reservoir can have a variety of sizes and shapes for holding the windshield wiper fluid. For example, in one embodiment the reservoir 14 can be sized to hold approximately a gallon of fluid for cleaning the windshield. It will be understood that the reservoir 14 can hold any amount of fluid such that the reservoir 14 is of a suitable size for fitting under the hood of the automobile. The reservoir 14 can also have various shapes. In one embodiment, the reservoir 14, as shown in FIG. 1, is substantially rectangular in shape with a smaller rectangular portion at the bottom of the reservoir for collecting any additional contaminants in the fluid and for holding a tablet that may be added to the fluid, as will be discussed in more detail below. The bottom of the reservoir 14 can include a well of any size and shape for holding the tablet and additional contaminants in the fluid.

The reservoir 14 also includes a pump inlet 24 for pumping the windshield wiper fluid from the reservoir 14 to the windshield 16 for use in cleaning the windshield 16 of the automobile. The pump used to pump the fluid from the reservoir 14 can be any standard pump that can accomplish this fluid pumping. The pump inlet 24 is positioned a distance away from the bottom of the reservoir 14, as shown in FIG. 1 This prevents any contaminants, such as precipitate or other dirt particles, that may settle towards the bottom of the reservoir 14 from being pumped to the windshield 16. The pump inlet 24 can be positioned in most locations along the side of the reservoir 14 as long as the pump inlet 24 is not too close to the bottom of the reservoir 14 to avoid any precipitate or dirt that may be accumulating in that location.

The reservoir 14 can also include features to prevent the reservoir 14 from overflowing with fluid. In one embodiment, the reservoir 14 includes an overflow outlet 26 positioned near the top of the reservoir. The overflow outlet 26 is configured to prevent the reservoir 14 from filling beyond a certain level at which the overflow outlet 26 is positioned. The overflow outlet 26 allows excess fluid to flow out of the reservoir 14 and drain out of the undercarriage of the automobile. This prevents the reservoir 14 from overflowing with fluid and leaking into the hood of the automobile.

A tablet 28 may optionally be added to the reservoir and can provide a variety of functions. In one embodiment, the tablet 28 is formed from a material for removing various types of contaminants from the fluid. For example, the tablet 28 can be used to filter calcium from the fluid in the reservoir 14. The tablet 28 can also be used to prevent freezing of the fluid, for example, by lowering the freezing point of the fluid if the tablet 28 contains an alcohol. The tablet 28 can also have other features, such as additives for creating a water repellant surface on the windshield of the automobile. Thus, the tablet 28 can be configured to have a variety of uses, including but not limited to contaminant filtering, antifreeze, and water repelling. For example, the tablet 28 can include Rain-X, manufactured by ITW Global Brands, to aide in the repelling of water on the windshield.

In operation, the reservoir 14 of the windshield wiper fluid refilling system 10 can be filled with rain water, or can be filled with other water or fluid if there is not enough rain to keep the reservoir full. The fluid passes through the removable filter 12 to remove particles and contaminants from the fluid. The removable filter 12 can be removed and either cleaned or replaced by the automobile owner as needed. The fluid flows into the reservoir 14 and can be pumped to the windshield of the automobile through the pump inlet 24. The reservoir 14 may not be accessible to the automobile owner as the hood of the car may be sealed to prevent access to the various components stored under the hood of the automobile. In order to replace or clean the reservoir and/or replace the tablet, the automobile may have to be serviced by a professional mechanic or other service provider.

Unless otherwise indicated, all numbers expressing lengths, widths, depths, or other dimensions, and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of any claim. No language in the specification should be construed as indicating any non-claimed element essential to the practice of the disclosure.

Groupings of alternative elements or embodiments disclosed herein are not to be construed as limitations. Each group member may be referred to and claimed, individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A windshield wiper fluid system, comprising:
   a removable filter having a top surface substantially flush with a hood of an automobile, the removable filter configured to receive fluid through a first opening from outside the automobile, the removable filter including ribs extending down from a top portion and ribs extending up from a bottom portion of the removable filter therein for trapping contaminants from the fluid; and
   a reservoir configured to couple to the removable filter and receive the fluid from the removable filter through a second opening formed therein, the reservoir including a pump inlet configured to pump the fluid from the reservoir to a windshield of the automobile.

2. The windshield wiper fluid system of claim 1, wherein the ribs decrease in size from the first opening in the removable filter to the second opening in the removable filter.

3. The windshield wiper fluid system of claim 1, wherein the reservoir includes an overflow outlet to prevent the reservoir from overflowing with fluid.

4. The windshield wiper fluid system of claim 1, wherein the reservoir includes a portion configured to hold a tablet.

5. The windshield wiper fluid system of claim 1, wherein the reservoir is located under a hood of the automobile.

6. The windshield wiper fluid system of claim 5, wherein the hood is sealed to prevent direct access to the reservoir.

7. An automobile windshield wiper fluid-system, comprising:
   a sealed hood:
   a removable filter having a top surface substantially flush with the sealed hood, the removable filter configured to receive fluid through a first opening from outside an automobile, the removable filter including ribs extending down from a top portion and ribs extending up from a bottom portion of the removable filter therein for trapping contaminants from the fluid; and
   a reservoir configured to couple to the removable filter and receive the fluid from the removable filter through a second opening formed therein, the reservoir including a pump inlet configured to pump the fluid from the reservoir to a windshield of the automobile.

8. The automobile of claim 7, wherein the reservoir is configured to be refilled through the removable filter without removing the hood.

9. The automobile of claim 8, wherein the reservoir is located under a hood of the automobile.

10. The automobile of claim 7, wherein the ribs decrease in size from the first opening in the removable filter to the second opening in the removable.

* * * * *